United States Patent [19]

Nail

[11] 4,335,581
[45] Jun. 22, 1982

[54] FALLING FILM FREEZE EXCHANGER

[75] Inventor: James A. Nail, Carol Stream, Ill.

[73] Assignee: Chicago Bridge & Iron Company, Oak Brook, Ill.

[21] Appl. No.: 292,265

[22] Filed: Aug. 12, 1981

[51] Int. Cl.³ .................. B01D 9/04; C02F 1/22
[52] U.S. Cl. ................................. 62/123; 165/141; 165/142
[58] Field of Search ............ 62/67, 123, 124, 502, 62/317; 165/141, 142

[56] References Cited

U.S. PATENT DOCUMENTS

| | | | |
|---|---|---|---|
| 2,896,418 | 7/1959 | Berger | 62/123 |
| 3,403,726 | 10/1968 | Jones et al. | 165/142 |
| 4,224,982 | 9/1980 | Frei | 165/141 |
| 4,286,436 | 9/1981 | Engdahl et al. | 62/123 |
| 4,296,612 | 10/1981 | Allo | 62/123 |

*Primary Examiner*—Ronald C. Capossela
*Attorney, Agent, or Firm*—Merriam, Marshall & Bicknell

[57] ABSTRACT

A falling film freeze exchanger having a plurality of spaced apart vertical freeze tubes secured in, and penetrating, an upper and a lower tube sheet; a shell around the tube sheets and connected thereto; a header surrounding and joined to the upper part of the shell and extending above the top tube sheet and laterally outwardly from the shell; means to deliver a liquid process feed stream into the header; and a layer of insulation surrounding that part of the shell surrounded by the header.

7 Claims, 2 Drawing Figures

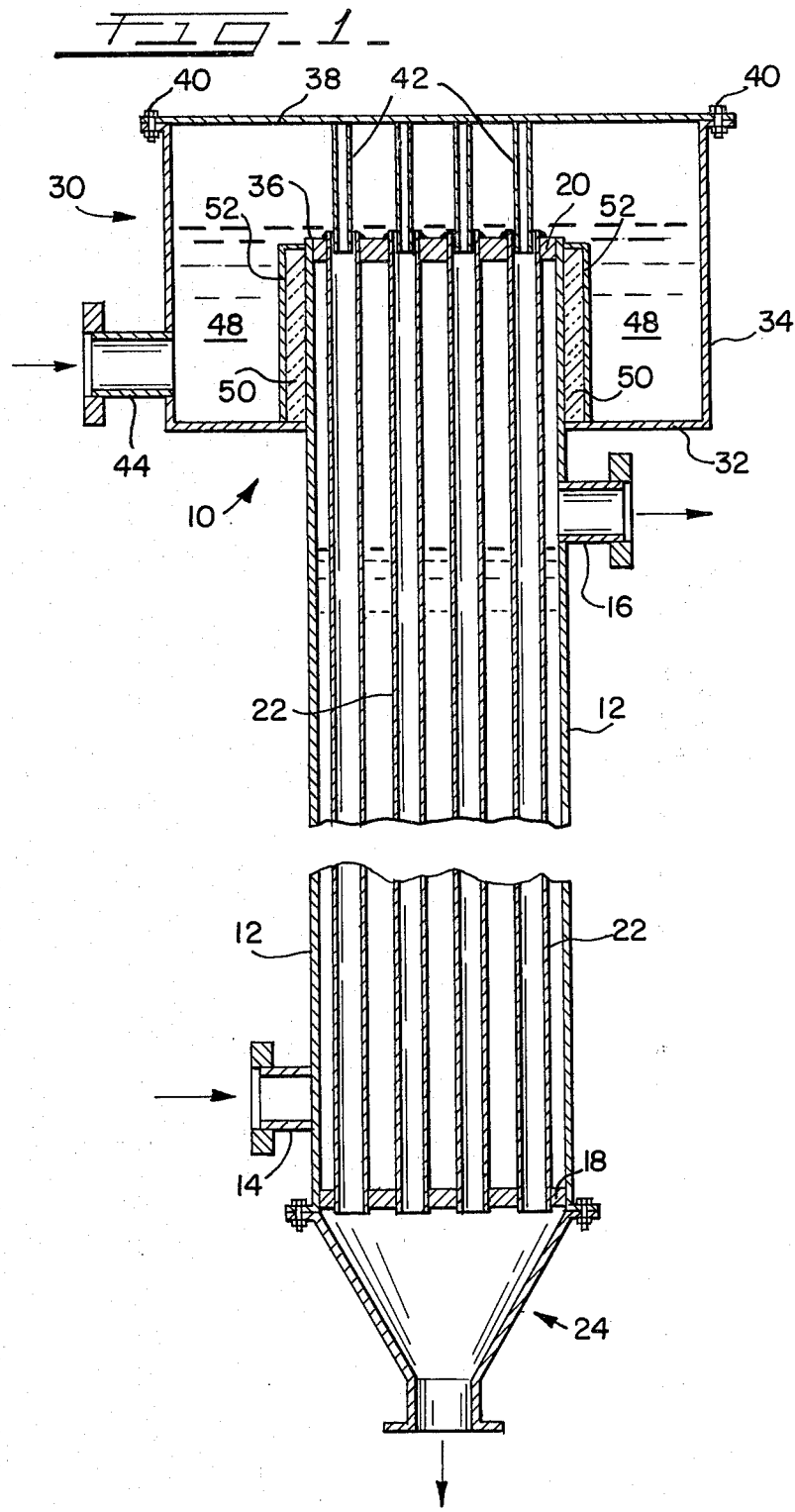

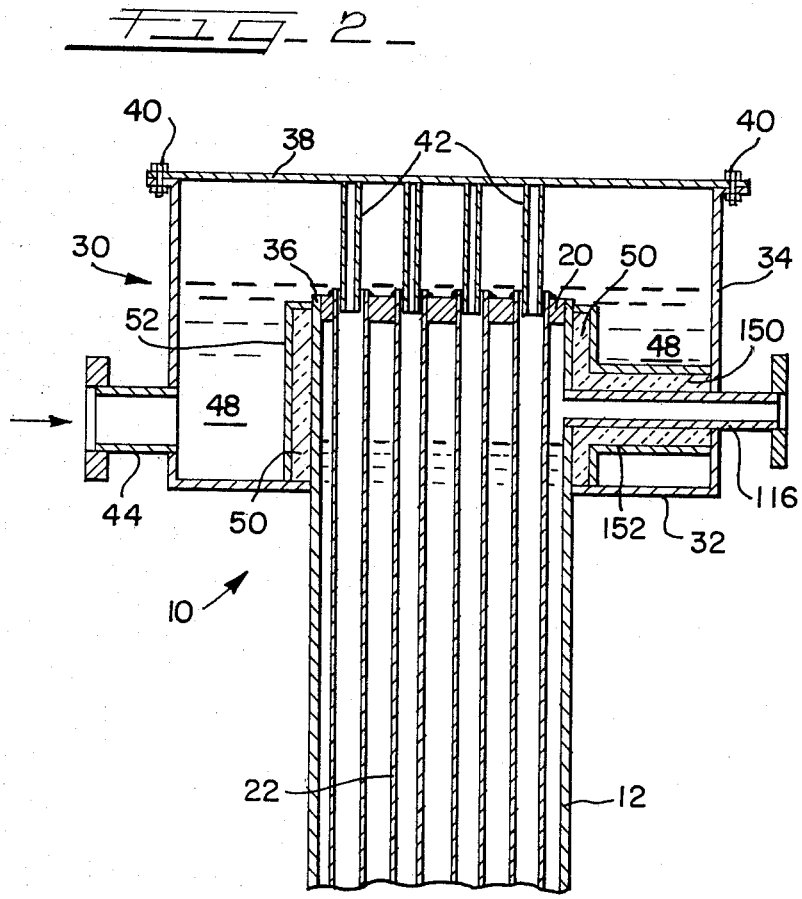

FALLING FILM FREEZE EXCHANGER

This invention relates to apparatus and methods for concentrating a liquid mixture containing dissolved or suspended solids by freezing part of the liquid carrier or solvent. More particularly, this invention pertains to an improved falling film freeze exchanger, for concentrating such liquids, of the shell and tube type with a layer of insulation surrounding part of the shell surrounded by a header.

BACKGROUND OF THE INVENTION

Various freeze processes have been developed to produce potable water from seawater or brackish water; to concentrate fruit juices such as orange juice and grape juice, vegetable juices such as tomato juice, and coffee; and to separate dissolved or suspended salts form the liquid carrier. See, for example, the U.S. Pat. Nos. of Ashley et al 3,070,969; Ashley 3,477,241; Ashley 3,501,924; Ganiaris 3,620,034; Johnson 3,664,145; and Ogman 4,091,635.

Many types of equipment and heat exchangers have been used in the described freeze processes, but shell and tube heat exchangers, although widely used for heat exchange, apparently have been used only on a limited basis as freeze exchangers.

A shell and tube heat exchanger has an array of tubes extending between and through two spaced apart tube sheets surrounded by a shell. The shell is provided with an inlet and an outlet so that a suitable heat exchange fluid can be circulated through the shell to cool or heat a fluid flowing through each tube.

Each end of the array of tubes can be left open, or exposed, for use in some processing operations. For other operations, one or both ends can be enclosed by a fluid retaining header, which may or may not have a removable cover or access port. When only one header is present it can be either a fluid inlet or fluid outlet header. When a header is positioned at each end, one header can be a fluid inlet while the other can be a fluid outlet. Such an arrangement is conventional for once-through or single pass heat exchangers. The fluid inlet and outlet headers, or portions thereof, are provided with suitable conduit means for supplying and removing fluid.

Although shell and tube heat exchangers are generally used to heat a fluid stream, they can be used for cooling such a stream. Shell and tube heat exchangers of the described types can be used as freeze exchangers for producing fresh water from brackish water and seawater, for concentrating fruit and vegetable juices, and in industrial crystallization processes. As the liquid flows through each tube, it can be cooled enough to crystallize a solid from the liquid. Thus, by cooling seawater, ice is obtained which when separated, washed, and melted provides potable water. When a fruit or vegetable juice is similarly chilled, ice forms and is removed to provide a concentrated juice.

Heat exchangers of the described types can use any cooling fluid on the shell side to cool a liquid flowing through the tubes. The fluid can be fed through one end and removed through the other end of the heat exchanger in a substantially unidirectional flow. Some suitable cooling fluids are ammonia and Freon brand refrigerants.

One of the major problems in freeze concentrating a liquid mixture in a shell and tube freeze exchanger has been the deposition of frozen solvent (usually ice) or solute, on the freeze exchanger surfaces. Buildup of a solid, such as ice, lowers heat transfer and reduces the efficiency of the apparatus. In addition, if buildup of ice or some other frozen solvent or solid continues it can plug the apparatus completely, making it necessary to shut down to thaw the frozen material. This can happen very readily because the solids usually first deposit at the inlet ends of the tubes and on the adjacent tube sheet. Accordingly, a need exists for improved shell and tube freeze exchangers which can be used over extended time periods by reducing or avoiding formation of solids deposited on the inlet tube ends and tube sheet. Also needed is apparatus for freeze concentrating liquid mixtures using shell and tube freeze exchangers which avoids or minimizes formation of solid deposits.

SUMMARY OF THE INVENTION

According to the invention there is provided a falling film freeze exchanger comprising a plurality of spaced apart vertical freeze tubes secured in, and penetrating, an upper and a lower tube sheet; a shell around the tube sheets and connected thereto; a header surrounding and joined to the upper part of the shell and extending above the top tube sheet and laterally outwardly from the shell; means to deliver a liquid process feed stream into the header; and, a layer of insulation surrounding that part of the shell surrounded by the header. By insulating that part of the shell surrounded by the header, freezing of the process fluid takes place in the tubes and not in the liquid pool in the header so that buildup of frozen deposits in the header is reduced or avoided.

The means to deliver the liquid process feed stream into the header desirably includes an opening in the header below the upper tube sheet. This permits process liquid to accumulate in the header and eliminates excessive turbulence in the liquid pool since incoming liquid enters beneath the pool surface. This also equalizes liquid distribution to the tubes. The process liquid is allowed to rise to a level which provides enough of a liquid head to force the desired amount of liquid into the tube upper ends.

According to a further aspect of the invention, a cooling fluid inlet opening is provided in the lower portion of the shell and a cooling fluid outlet opening is located in the upper portion of the shell so that cooling fluid supplied to the shell side of the freeze exchanger by means of the fluid inlet can be withdrawn through the fluid outlet without the cooling fluid significantly cooling process liquid in the header. The cooling fluid outlet opening can be located beneath the header so that cooling fluid supplied to the shell side of the freezer exchanger by means of the fluid inlet can be withdrawn through the fluid outlet to maintain the cooling fluid level lower than the bottom of the header. Alternatively, the cooling fluid outlet opening in the upper portion of the shell can be insulated and extend through the header so that cooling fluid can be withdrawn through the fluid outlet without the cooling fluid significantly cooling process liquid in the header. In this way, heat transfer from a liquid pool of a circulating liquid coolant, or an evaporating refrigerant, is reduced and the formation of cold spots or unwanted deposits in the upper part of the heat exchanger is minimized.

The falling film freeze exchanger desirably includes a weir tube internally telescoping, with clearance, the top portion of each freeze tube. The weir tubes may be supported by the header.

BRIEF DESCRIPTION OF THE DRAWINGS

FIG. 1 is a vertical sectional view of one embodiment of a falling film freeze exchanger according to the invention; and FIG. 2 is similar to the upper part of the freeze exchanger shown in FIG. 1 but with the cooling fluid outlet extending through the header.

DETAILED DESCRIPTION OF THE DRAWINGS

The same elements in the various views of the drawings will be identified by the same numbers to the extent this is reasonable and practical.

With reference to the drawings, the freeze exchanger 10 has a vertical circular cylindrical shell 12, an inlet 14 for a cooling fluid and a cooling fluid outlet 16 for removing the warmed cooling fluid from inside shell 12. Shell 12 extends from metal tube sheet 18 at the lower end to metal tube sheet 20 at the upper end. A plurality of parallel vertical tubes 22 extend continuously from tube sheet 18 to tube sheet 20. The tubes are desirably welded in place to the tube sheets. A header 24 is located at the bottom of the freeze exchanger to facilitate merging the process liquid exiting the plurality of tubes 22 into a single stream for further processing.

Header 30 is supported by the top of the shell 12. The header 30 has a circular flat horizontal bottom plate 32 which is joined to shell 12 substantially below the shell top edge 36. Cylindrical shell wall 34 is joined at its lower edge to the periphery of bottom plate 32. Circular cover plate 38 is removably connected to the top of shell 34 by bolts 40. Stub tubes 42, connected to top 38, extend downwardly into the top portion of tubes 22 with sufficient clearance to provide an annulus through which process liquid can flow downwardly and into tubes 22 as a thin film.

Process liquid inlet 44 is provided in the lower part of shell wall 34 so that the liquid can be fed to the header beneath the surface of process liquid pool 48 in header 30. The surface of pool 48 is maintained a sufficient height above the top of tube sheet 20 to provide for adequate flow of process liquid through the annulus between stub tubes 42 and the mouths of tubes 22.

Cooling fluid, desirably a refrigerant, in liquid form, is supplied by inlet 14 to shell 12. The refrigerant level, in this embodiment of the invention, is maintained no higher than cooling fluid outlet 16 so as to avoid having cooling liquid in the upper portion of the shell, particularly in that part of the shell surrounded by header 30. Even though vapor from the liquid refrigerant fills the space in the shell above the liquid refrigerant level, there is less heat exchange between the vapor than the liquid refrigerant so that less cooling of process liquid in header 30 takes place. Nevertheless, it is important to position insulation 50 around the outside of the shell portion inside of header 50 to further reduce heat exchange in that locality between the process liquid in the header and the cooling fluid. Covering 52 can, if necessary, be placed on insulation 50 to prevent process liquid from entering the insulation.

FIG. 2 illustrates a second embodiment of the invention. In this embodiment, all elements should be assumed to be the same as shown in FIG. 1, except for those which will now be described. As shown in FIG. 2, the cooling fluid outlet constitutes a conduit 116 which communicates with the internal upper space in shell 12. Insulation 150 surrounds conduit 116 and it in turn is surrounded by a jacket 152, desirably made of metal plate. In this way, heat exchange between process liquid 48 in header 30 and the cooling fluid exiting outlet 116 is substantially eliminated and buildup of ice in the header is reduced or avoided. This second embodiment of the invention utilizes more efficiently the heat transfer surface area available on the tubes than does the embodiment of FIG. 1 since more of the tubes can be surrounded by a liquid cooling material.

The foregoing detailed description has been given for clearness of understanding only, and no unnecessary limitations should be understood therefrom, as modifications will be obvious to those skilled in the art.

What is claimed is:

1. A falling flim freeze exchanger comprising:
   a plurality of spaced apart vertical freeze tubes secured in, and penetrating, an upper tube sheet and a lower tube sheet;
   a shell around the tube sheets and connected thereto;
   the shell having a cooling fluid inlet and a cooling fluid outlet for circulating cooling fluid around the tubes;
   a header surrounding and joined to the upper part of the shell and extending above the top tube sheet and laterally outwardly from the shell;
   means to deliver a liquid process feed stream into the header; and
   a layer of insulation surrounding that part of the shell surrounded by the header.

2. A falling film freeze exchanger according to claim 1 in which the means to deliver a feed stream into the header includes an opening in the header below the upper tube sheet.

3. A falling film freeze exchanger according to claim 1 in which the cooling fluid inlet opening is in the lower portion of the shell and the cooling fluid outlet opening is in the upper portion of the shell so that cooling fluid supplied to the shell side of the freeze exchanger by means of the fluid inlet can be withdrawn through the fluid outlet without the cooling fluid significantly cooling process fluid in the header.

4. A falling film freeze exchanger according to claim 3 wherein the cooling fluid outlet opening is beneath the header so that cooling fluid supplied to the shell side of the freeze exchanger by means of the fluid inlet can be withdrawn through the fluid outlet to maintain the cooling fluid level lower than the bottom of the header.

5. A falling film freeze exchanger according to claim 3 wherein the cooling fluid outlet opening in the upper portion of the shell is insulated and extends through the header so that cooling fluid supplied to the shell side of the freeze exchanger by means of the fluid inlet can be withdrawn through the header.

6. A falling film freeze exchanger according to claim 1 including a weir tube internally telescoping, with clearance, the top portion of each freeze tube.

7. A falling film freeze exchanger according to claim 6 in which the weir tubes are supported by the header.

* * * * *